United States Patent [19]

Briggs

[11] 4,134,198
[45] Jan. 16, 1979

[54] METHOD OF INSTALLING GRIP ON HANDLE

[75] Inventor: Robert E. Briggs, Cincinnati, Ohio

[73] Assignee: 'totes', Incorporated, Loveland, Ohio

[21] Appl. No.: 756,400

[22] Filed: Jan. 3, 1977

Related U.S. Application Data

[62] Division of Ser. No. 608,348, Aug. 27, 1975, Pat. No. 4,016,640.

[51] Int. Cl.² ............................................. B23P 11/02
[52] U.S. Cl. .................................... 29/450; 273/72 R
[58] Field of Search ......................... 29/450, 235, 280;
273/72 R, 75, 67 DB, 81 R, 81.4; 156/160, 294,
423; 16/116

[56] References Cited

U.S. PATENT DOCUMENTS

| 1,133,622 | 3/1915 | Darling | 273/75 |
|---|---|---|---|
| 1,165,484 | 12/1915 | Zimmerman | 273/72 R |
| 2,046,191 | 6/1936 | Smith | 29/450 X |
| 2,201,706 | 5/1940 | Sukohl | 29/450 X |
| 2,984,486 | 5/1961 | Jones | 273/75 X |
| 3,020,192 | 2/1962 | Stephens et al. | 29/450 UX |
| 3,606,326 | 9/1971 | Sparks et al. | 273/81 R |

Primary Examiner—Charlie T. Moon
Attorney, Agent, or Firm—Wood, Herron & Evans

[57] ABSTRACT

A grip for the handle of a hand-held implement that, in as-produced form, is comprised of a thin walled tubular member open at one end and a boot integral with the tubular member that closes its other end. The grip's average internal girth along its longitudinal axis, as produced, is substantially less than the average external girth of the implement's handle portion to be covered by the grip along that handle portion's longitudinal axis. The grip, which may have a novel exterior gripping surface, is produced by dipping a male mandrel into an elastomeric latex and, thereafter, curing the latex skin formed on the mandrel prior to stripping of the grip from the mandrel. The grip is installed on an implement's handle by creating a pressure differential between the interior and exterior of the grip, thereby causing the grip to stretch radially outward from its longitudinal axis. This stretching step allows the implement's handle to be inserted through the grip's open end until the handle's free end bottoms out in the grip's boot. Subsequently, the pressure differential is released, thereby causing the grip to stretch into a tight friction fit with the handle. The grip's boot may thereafter be removed by slicing off, if desired.

4 Claims, 10 Drawing Figures

METHOD OF INSTALLING GRIP ON HANDLE

This is a division of application Ser. No. 608,348, filed Aug. 27, 1975, now U.S. Pat. No. 4,016,640.

This invention is directed to hand-held implements. More particularly, this invention is directed to a unique grip for hand-held implements, and to unique methods of fabricating and installing same.

There are, of course, numerous different hand-held implements in use throughout the country today. Hand-held implements, basically, fall into two classes. The first class includes those hand-held implements used for work, and the second class includes those used for pleasure. In the first class are small hand tools such as screw drivers, hammers, chisels, wrenches, pliers, and the like, and large hand tools such as rakes, hoes, pruning shears, shovels, wheelbarrow handles, and the like. The second class mainly includes sporting goods equipment such as golf clubs, baseball bats, tennis rackets, paddle tennis paddles, badminton rackets, hockey sticks, canoe paddles and the like. The common basic characteristics to each of these hand-held implements, from the standpoint of this invention, are certain common characteristics of each implement's handle.

A first hand-held implement characteristic of importance to the grip of this invention, and the installation method associated therewith, is that the implement's handle must be generally linear (although not necessarily absolutely straight, as a slightly curved handle may be used) in configuration from one end to the other. That is, one end of the handle must be connected to the working head of the implement but the other end must not be connected to that implement's working head. Such a handle is hereinafter referred to as a free-end handle. Each of the implement examples noted in the above paragraph, in the most common form of each, possesses a free-end handle. An example of a handle on a hand-held implement which is connected at both ends to the implement's working head is a hand-held carpenter's saw of the cross-cut or rip type, i.e., the handle for a regular hand-held carpenter's saw is in the form of a closed loop connected to the saw's blade. The grip of this invention is not adapted for use on such a carpenter's saw.

A second hand-held implement characteristic of importance to the grip of this invention, and installation method associated therewith, is that the free-end handle's external girth and cross-sectional area may well vary from one end to the other depending on the hand-held implement under review, and that handle also may be symmetrical or asymmetrical along its longitudinal axis from one end to the other. Indeed, the grip of this invention, and the method of installation associated with it, are well suited to accommodate such a variance in one or more of external girth, cross-sectional configuration, and symmetry, from one end to the other of an implement's free-end handle. For example, the handle of a hammer is generally linear (but may not be exactly linear) from one end to the other, and is connected to the hammer's head at one end but is free or unconnected at the other end, but the external girth and cross-sectional configuration of that handle varies from one end to the other, and the handle may well be non-symmetrical about its longitudinal axis from one end to the other; such variations occur, of course, because hammer handles are often shaped in an effort to accommodate a user's hand to achieve the easiest possible work position for that user's hand. The grip and installation method of this invention are well suited for use with such a hammer handle. Another example, and the example by which the grip of this invention will be described in detail below, is a baseball bat's handle. A bat's handle is exactly linear, and is symmetrical about its longitudinal axis, from one end thereof to the other, but the bat's handle varies widely in its external girth and cross-sectional area from one end to the other along its longitudinal axis. As is well known, a baseball bat's handle necks down from a relatively large diameter for that portion adjacent the bat's head to a relatively small diameter for that portion adjacent the bat's knob, the knob itself terminating the handle end of the bat. The baseball bat handle has been chosen to illustrate the grip of this invention, and the installation method associated therewith, for the reason that same illustrates a handle having widely differing external girths from one end to the other, thereby illustrating the wide latitude and adaptability of the grip of this invention and installation method associated therewith.

Accordingly, it has been a primary objective of this invention to provide a novel grip for the handle of a hand-held implement, the structural concepts of the grip being adaptable for use in a wide variety of hand-held implements each having, as the basic structural characteristic connecting those implements, a generally linear (although not necessarily absolutely straight) handle connected at only one end to the tool's working head.

It has been another objective of this invention to provide such a novel grip that includes unique exposed gripping surface characteristics, same permitting the user to obtain and maintain good purchase on an implement's handle on which the grip has been installed.

It has been still another objective of this invention to provide a novel method of producing the novel grip for the handle of a hand-held implement, that novel method permitting the grip to be provided with structural chracteristics that allows the simple and easy installation of same on a generally linear handle regardless of the external girth and cross-sectional area variation in that handle from one end thereof to the other, and regardless of the symmetry or lack thereof from one end thereof to the other.

It has been a further objective of this invention to provide a novel installation method for the novel grip on a free-end handle of a hand-held implement, the installation method permitting an original equipment grip to be easily, simply, and quickly installed during the initial manufacture of the hand-held implement in a factory environment, and also permitting a replacement grip to be easily, quickly and simply installed in a use or in-the-field environment.

These objectives and advantages are provided in the grip for the handle of a hand-held implement of this invention, which grip is comprised, in the as-manufactured attitude, of a generally linear and generally tubular member open at one end and closed at the other end by a boot integral with the tubular member. The grip's average internal girth from one end to the other, as produced, and before installation on a handle, is substantially less than the average external girth of the implement's handle from one end to the other as to that handle position where the grip is to be mounted. The grip is fabricated of an elastomeric latex, e.g., a rubber latex, having a relatively high percentage elongation at break, a relatively high tensile strength at break, and a relatively low modulus. The grip is produced by dipping a male mandrel having the grip's approximately as-produced (and before-installation) size and geometry, and as-produced gripping surface, into the elastomeric latex (the mandrel preferably being preheated prior to dipping), and thereafter curing the latex skin formed on the mandrel (that curing preferably being accelerated by exposure of the mandrel to an elevated temperature after dipping). After curing, the grip is stripped from the mandrel and turned inside out, thereby orienting the grip's exterior surface on the outside face of the grip. This dipping fabrication method permits the grip to be provided with a relatively thin wall of a highly elastomeric material that provides a tensile strength at break, percentage elongation at break, and modulus, desired. These desirable grip characteristics, in turn, permit the grip to be installed very simply, easily and quickly on a free-end handle of a hand-held implement, either at the initial production location of the implement or in the field, by creating a pressure differential between the interior and exterior of the grip sufficient to expand the grip into an internal girth throughout its length which is greater than that handle section (within that handle portion on which the grip is to be mounted) having the largest external girth. After expanding or stretching of the grip, the implement's handle is simply inserted into and through the grip's open end until the handle's free end bottoms out in the grip's boot. The pressure differential is thereafter released, thereby permitting the grip to contract back toward its as-produced geometry and dimensions into a tight friction fit with the handle since the average internal girth of the grip as manufactured is substantially less than the average external girth of the handle within that handle portion where the grip has been mounted.

Other objectives and advantages of this invention will be more apparent from the following detailed description taken in conjunction with the drawings in which.

Figures 1, 2, 2A, 3, 4:
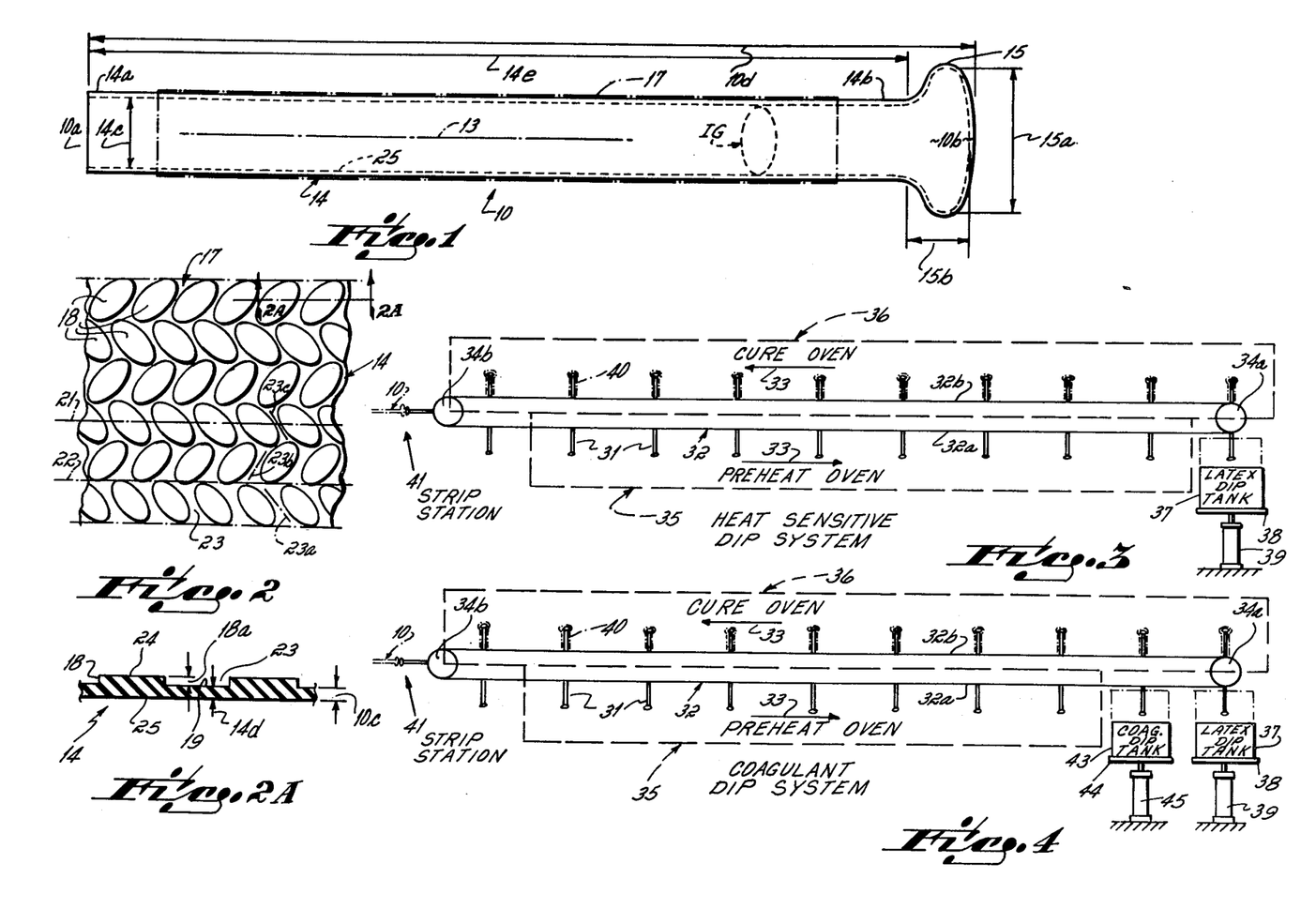
FIG. 1 illustrates a novel grip for a baseball bat handle as manufactured in accord with the principles of this invention.
FIG. 2 illustrates a detailed section of the grip's tubular member as shown in FIG. 1, the tubular member's section having been slit along a line parallel to the grip's longitudinal axis and laid flat, that detail illustrating the novel cushion or pad configuration provided on the grip's exterior or gripping surface.
FIG. 2a is a cross-sectional view taken along line 2a–2a of FIG. 2.
FIG. 3 illustrates a first method, in accord with the principles of this invention, of fabricating the FIGS. 1 and 2 grip.
FIG. 4 is a view similar to FIG. 3 illustrating a second method of fabricating the FIGS. 1 and 2 grip.

As previously mentioned, the grip for the handle of a hand-held implement of this invention, and the methods of producing and installing same, for purposes of illustration of this invention, will be described in connection with a grip 10 for a baseball bat 11. The bat's elongated or longitudinally extended free-end handle 12 is linear in configuration from one end 12a to the other 12b with end 12a being connected to the bat's working head 11a but end 12b being disconnected from the working head 11a. Further, and in this bat 11 environment, the inner 12a and outer 12b ends of the bat's free-end handle 12 are displaced one from the other a distance equal to the handle's length 12c, and the handle's free end 12b is also displaced from the bat's working head 11a at a distance equal to the handle's length. This general physical relation of the handle's ends 12a, 12b one with the other, and with the bat's working head 11a, is the same as is found in many other hand-held implements, among which are those recited in the second paragraph of this description. Note further that the bat's handle 12 is rigid, i.e., does not bend along its length from one end to the other; this characteristic is also common to the previously recited hand-held implements in the second paragraph of this description. The grip 10 itself is illustrated in FIG. 1, that Figure illustrating the grip as-produced and prior to installation on the baseball bat's handle 12. As is readily apparent from FIG. 1, the grip 10 is linear from open end 10a to closed end 10b, and is symmetrical about the centerline 13. The grip 10, as manufactured, is formed of two basic portions. The first portion is a cylindrical and tubular grip portion 14 that is open to atmosphere at open end 10a. The second portion is a boot 15 portion formed integral with the tubular portion 14 at that end of the grip opposite to the open end 10a, thereby providing the closed end 10b (i.e., closed to atmosphere) of the grip. The boot 15 itself is shaped in the general configuration of knob 16 at the free end 12b of the baseball bat's handle 12.

The average internal girth IG of the grip's tubular portion 14 (from one end 14a to the other 14b along its axis 13) is preferably at least about five percent (5%) less than, and no more than about fifty percent (50%) less than, the average external girth EG of the bat's handle portion 12 to be covered by the grip 10 (i.e., the handle's gripping portion) from one end 12a to the other 12b along its axis 11b. Indeed, the internal girth IG of the grip's tubular portion 14 may well fall within this percentage dimensional relation vis-a-vis the external girth EG of the handle's grip portion 12 at all points along its axis 13 in certain end use applications. However, the important criteria is that the internal girth IG of the grip's tubular portion be sized and configured relative to the external girth EG of the handle's grip portion 12 from one end 12a to the other 12b so as to provide a relatively tight friction fit after the grip 10 has been installed on the handle 12. Girth, as used in connection with this invention, refers to the inside peripheral dimension of the grip 10 and to the outside peripheral dimension of the implement's handle 12 as measured in a plane transverse to the respective axes 13, 11b of the grip and handle.

As an example, the grip's inside diameter 14c within tubular portion 14 may be about 0.90 inches for a major league baseball bat. A typical such bat has an average external diameter 12d of about 1.15 inches from one end 12a of the handle to the other 12b (excluding the knob 16 portion of the handle). This provides an average internal girth IG for the tubular portion 14 that is about twenty-two percent (22%) less than the average external girth EG of the bat's handle 12 for the presently preferred embodiment. That portion of the bat's handle 12 used in computing the average external girth EG is that portion which will be covered by the cylindrical portion 14 of the grip 10 shown in FIG. 1. This dimensional relationship of the grip's internal girth IG to the baseball bat handle's average external girth EG requires that the grip's tubular portion 14 must be substantially stretched outwardly (away from centerline 13) in a radial fashion throughout its length 14e in order to install same onto the baseball bat's handle 12, and permits the grip, once it is installed on the baseball bat's handle, to be frictionally held in fixed relation thereto as long as the material from which the grip is fabricated is a relatively high friction material such as rubber which tends not to slip against the substrate on which it is carried. Although the dimensional relationship of the grip's tubular portion 14 to the baseball bat's handle portion 12 is most important because the tubular portion 14 includes the grip's handgrip section 17 adapted to be gripped by a user's hand, it is also worth noting that the inside major dimension 15a and inside minor dimension 15b of the grip's boot 15 is substantially less than the similar external dimensions of the bat's knob 16. Hence, the boot 15 must also be stretched substantially to permit the bat's knob to be placed in operational relation therewith. It will be understood, therefore, that the grip's internal girth IG may vary from one end 10a to the other 10b, and may vary in cross-sectional geometry (as opposed to the cylindrical cross-sectional configuration of the grip's tubular portion 14) if such were necessary to accommodate a hand-held implement's handle which had a widely varying external girth EG and/or cross-sectional geometry from one end thereof to the other.

The average wall thickness 10c throughout the overall length 10d of the grip 10 must be thin enough to permit stretching of the grip (as described in detail below) upon exposure to relatively low pressure differentials, e.g., perhaps even as low as 2 psi under certain conditions, between the grip's inner and outer surfaces. A typical average wall thickness 10c for the bat handle's grip 10 throughout its length 10d, which thickness will also depend to some extent on the elastomeric material from which the grip is fabricated, may be about 0.04 inches (the grip's wall thickness being shown greatly enlarged for illustrative purposes in FIG. 1). A grip 10 fabricated in accord with one of the formulations set out below, and with the wall thickness dimension and configuration heretofore mentioned, will stretch upon exposure of a pressure differential of about 6–7 psi (and, particularly, upon exposure to a vacuum about 12–20 inches mercury). This wall thickness 10d may be thicker in the grip's boot portion 15 than throughout the grip's tubular portion 14 since that area will be exposed to greater wear from scuffing on the ground during use on a baseball diamond if that boot is not removed after installation of the grip 10 onto the baseball bat 11. It is preferred, therefore, that the average wall thickness 10c of the grip 10 be between about 0.01 inch and 0.10 inch; this wall thickness range is preferred because beneath the lower limit the grip would not have sufficient durability to provide a useful life to the user, and above the upper limit of the range it is believed the grip could not be installed with relatively low pressure differentials by the installation method of this invention.

It is preferred that a portion 17 of the external surface area of the grip's tubular portion 14, namely, that portion where the grip 10 is adapted to be held by the user's hands, be provided with a series of cushions 18 in a particular geometric configuration thereon. As illustrated in FIG. 2, portion 17 of the cylindrical portion 14 of the grip 10, throughout and around the exterior periphery of that portion 17, is provided with a series of cushions or pads 18 raised or elevated out of the exterior base surface 19 of the grip to a height 18a. The pads 18 are generally elliptical in shape, and are sub-grouped into a series of longitudinal strips extending in spaced parallel relation from adjacent one end 14a to adjacent the other end 14b of the grip's tubular portion 14 about the outer periphery of that tubular portion 14. The longitudinal pad 18 strips are indicated by centerlines 21. The multiple longitudinal strips 21 of pads 18 are separated one from the other by longitudinal (but not necessarily linear) sweat main-channels (indicated by centerlines 22) which are, of course, in the nature of valleys defined by the upraised pads. Furthermore, the pads 18 within each longitudinal strip 21 are likewise separated one from the other by sweat sub-channels (indicated by centerlines 23a, 23b, 23c), these sweat sub-channels being angulated relative to the central longitudinal axis 13 of the grip 10 (and, hence, relative to the longitudinal strip channels 22). These sub-channels 23 are also in the nature of valleys defined by the upraised pads. Note that the sweat sub-channels 23 (each of which is generally saw-toothed in configuration) within each strip channel 22 are disposed parallel one to the other about the grip's outside circumference throughout portion 17 of the grip's tubular portion 14. It is preferred that the saw-tooth sub-channels 23 each be angled at about 45° relative to the longitudinal channels 22. Of course, and while the sweat sub-channels 23 are shown in saw-tooth fashion on the outer surface of and about the circumference of the grip 10, same also may be disposed in simple parallel circular fashion about the outer periphery. Thus, the grip's exterior surface area, within pad portion 17 of the handle's tubular portion 14, is provided with longitudinal sweat main-channels 22 and with circumferential sweat sub-channels 23, same cooperating to function in permitting the sweat from the user's hands which grip the grip's pad portion 17 to be drained away from beneath those hands, all in an effort to maintain a non-slip relationship, i.e., to maintain good purchase, between the user's hands and the grip of this invention regardless of the hand-held implement on which it is used. In addition to the enhanced frictional contact or purchase of the user's hands with the grip 10 because of the pads 18 and the sweat channels 22, 23 provided, the upraised pads also provide a cushioning effect to the user's hands. For example, and where the grip 10 with pads 18 is used on a baseball bat 11, the batter feels less sting in his hands when he mis-hits a ball with the bat. Such is, of course, especially useful in connection with bats used in municipal baseball leagues for children. It is preferred that the pads 18 be upraised at least about 0.005 inches off the outside surface 19 of the grip to provide the cushion advantages, as well as the perspiration drainage advantages, which the grip 10 structure of this invention provides to the user. While the pads 18 are shown as elliptical for purposes of illustration, same may be rectangular or trapezoidal or even of a generally random geometry, the important point being a multiplicity of upraised pads 18 which define sweat channels 22 and/or 23 at least one of longitudinally and circumferentially of the grip. Additionally, the pads 18 themselves may be textured or roughened on their exterior or top surface 24 to provide increased frictional contact between the user's hands and the grip's tubular portion 14. Roughened or textured pads 18, in combination with smooth channels 22, 23 provided to enhance escape of prespiration from between the user's hands and the grip, proves quite effective and provides a very practical grip 10 highly useful in the field regardless of the implement on which the grip of this invention is used.

The material from which the grip 10 of this invention is fabricated may be any material which is sufficiently impermeable to air to withstand a pressure differential, and which will provide the desired tensile strength at break, percentage elongation at break, and modulus at 200% elongation characteristics (all as measured by ASTM Test Number D 412-68). The tensile strength at break of the material is preferably about 2000 psi to about 6000 psi, the percentage elongation at break is preferably about 400% to about 1000%, and the modulus at 200% elongation is preferably about 100 psi to about 500 psi. Also, the material preferably should have a tension set at 600% elongation no greater than about 2% to about 20% (also as measured by ASTM test Number D 412-68). The material used also preferably provides the interior surface 25 of the grip 10 with a relatively high static coefficient of friction, e.g., between about 0.8 and about 1.2 (as computed in accord with test information set out on Pages 217-219 of *Mechanical Engineer's Handbook*, edited by Lionel S. Marks, Fifth Edition, McGraw-Hill Book Co., Inc., New York, N.Y. 1951), since it is desirable that the grip be held in a non-slip frictional engagement with the handle 12 of the bat 11 (or other hand-held implement, and whether that handle be fabricated of wood, metal or plastic) so as to prevent any substantial slippage of the grip over the handle upon use of the bat, all as described in detail below. Under certain circumstances it may be desirable to coat a glue of some type on the bat's handle 12 prior to installation of the grip 10 thereon to enhance the fixed interconnection of the grip with the handle, but the grip of this invention and the installation method of this invention for the grip permits installation to be accomplished readily and easily whether a glue is used or not as will be apparent upon further detailed description below. Of course, the exterior static surface friction of the grip 10 is primarily dependent on the material from which the grip is fabricated, the surface design, i.e., the pad 18 design, and pad surface 24 texture. Such may vary depending on the end use of the implement itself (in some cases a greater static coefficient of friction may be desired on the exterior surface than on others). Additional desirable characteristics of the material from which the grip is made are that same should be relatively tear resistant, and should be able to withstand the elements, e.g., sun, rain, cold, as most hand-held implements with which the grip 10 of this invention are suited will be used outdoors at some point during the useful life of each. From a process standpoint in the manufacture of the grip of this invention, it is desirable that same be made from an elastomeric latex, for example, a rubber latex such as a natural rubber latex, styrene butadiene rubber latex, neoprene latex, or nitrile rubber latex.

The grip 10 for a hand-held implement 11 of this invention is preferably produced by dipping same in an elastomeric latex. Dipping is used, as opposed to molding or casting, because of the advantages provided in the grip 10 itself which are described elsewhere in this invention. Particularly, dipping permits the elastomeric grip 10 to be provided with a thin wall thickness 14d vis-a-vis a relatively extended length 10d for the grip, thereby permitting the grip to be provided with desired physical characteristics described above. The dipping method used to produce the grip 10 of this invention may either be a heat-sensitive latex dipping method (see FIG. 3) or a coagulant latex dipping method (see FIG. 4), both methods making use of an elastomeric latex as the basic elastic material from which the grip is fabricated. A typical heat-sensitive natural rubber latex compound which may be used is as follows:

| Compound Formula | Dry Parts by Weight |
|---|---|
| Natural rubber from latex | 100.0 |
| Nonyl phenoxy poly (ethylene oxy) ethanol | 0.3 |
| Sulfur | 2.0 |
| Zinc diethyl dithiocarbamate | 1.0 |
| Sym di-beta-napthyl-p-phenylene diamine | 1.0 |
| Zinc oxide | 0.5 |
| Poly vinyl methyl ether | 0.75 |
| Carbon black | 0.5 |
| Formaldehyde to pH 7.5 - 8.0 | |
| Microcrystalline & paraffin wax blended as anti-ozonant (Sunproof Regular from Uniroyal Chemicals, Division of Uniroyal, Inc., Naugatuck, Connecticut 06770) | 3.0 |

A typical coagulant-sensitive natural rubber latex compound that may be used is as follows:

| Compound Formula | Dry Parts by Weight |
|---|---|
| Natural rubber from latex | 100.0 |
| Nonyl phenoxy poly (ethylene oxy) ethanol | 0.3 |
| Sulfur | 2.0 |
| Zinc diethyl dithiocarbamate | 1.0 |
| Sym di-beta-napthyl-p-phenylene diamine | 1.0 |
| Zinc oxide | 0.5 |
| Carbon black | 0.5 |
| Formaldehyde to pH 9.5 - 10.0 | |
| Microcrystalline & paraffin wax blended as anti-ozonant (Sunproof Regular from Uniroyal Chemicals, Division of Uniroyal, Inc., Naugatuck, Connecticut 06770) | 3.0 |

The heat-sensitive latex dipping method is illustrated in FIG. 3. As shown in that FIG. 3, a series of male mandrels 31 are fixed in position on an endless conveyor chain 32, each mandrel having the approximate dimensions and exact configuration (e.g., for pads 18, sweat channels 22, 23, inside diameter 14c, boot dimensions 15a, 15b) on its exterior surface as is desired for the bat grip 10 illustrated in FIGS. 1 and 2. In practice, the actual dimensions of the mandrel will be about six to seven percent (6-7%) oversized relative to the desired dimensions of the as-produced grip 10 to allow for a limited degree of shrinkage in the grip's dimensions during curing if a composition in accord with one of the above formulations is used. The endless chain 32 is adapted to move in the direction of arrows 33 between opposed end sprockets 34a, 34b, each mandrel 31 on the lower run 32a of the chain passing through a preheat oven 35 having a temperature between about 140° F. and about 180° F. for between about 15 minutes and about 30 minutes, and each mandrel 31 on the upper run 32b of the chain passing through a curing oven 36 having a temperature between about 170° F. and about 190° F. for between about 120 minutes and about 180 minutes. A drive mechanism (not shown) is connected with one of the sprockets 35 for moving the mandrels in the direction of arrows 33. At one end of the chain's run, and adjacent sprocket 34a, there is provided a tank 37 adapted to receive a charge of the heat-sensitive latex of the compounding set forth above. The latex dip tank 37 is mounted on platform 38 which is vertically movable between a storage position (shown in solid lines) and a dipping position (shown in phantom lines) by a hydraulic motor 39 fixed to ground. After each mandrel 31 has passed through the preheat oven 35, and as each mandrel is disposed over the latex dip tank 35, the hydraulic motor 39 raises the dip tank from the solid line to the phantom line position so as to coat the mandrel with a skin-like coating 40 of the natural rubber latex compound. The dip tank 37 is then lowered back into the solid line position by the motor 39 so that the mandrel can proceed past the dipping station into the curing oven 36. Each mandrel 31 is so processed, and as succeeding mandrels are dipped preceding mandrels pass through the cure oven 36 to the strip station 41 adjacent sprocket 34b at the other end of the endless chain 32. Each dipped grip 10 is then stripped from its mandrel 31 simply by pulling same off at the strip station in an inverted fashion, then washed, dried, and thereafter the top edge 14a of the grip is trimmed if necessary to provide a standard length 10d product. The exterior surface texture of the grip's pads 18, channels 22, 23 and boot 15 is, as previously noted, provided by the exterior surface of the machined mandrels 31.

A coagulant latex dipping method is illustrated in FIG. 4, the reference numerals used in describing the FIG. 3 method also being used to identify like equipment in the FIG. 4 method. The primary difference between the coagulant latex dipping method and the heat-sensitive latex dipping method, from an equipment standpoint, is the provision of a coagulant dip tank 43 in addition to the latex dip tank 37. As shown in FIG. 4, the coagulant dip tank 43 is provided upstream of the latex dip tnak 37 vis-a-vis the travel direction 33 of the endless chain conveyor 32. The coagulant dip tank 43 is mounted on a platform 44 which is vertically movable by means of a hydraulic motor 45 fixed to ground, the coagulant dip tank being moved between a storage position (shown in solid lines in FIG. 4), and a mandrel dipping position (shown in phantom lines in FIG. 4). The coagulant dip tank 43 and latex dip tank 37 dipping or operational sequence is controlled by timing means (not shown) that is responsive to the relative position of the mandrels vis-a-vis those tanks. The coagulant latex dipping method also makes use of the same mandrels 31 used in the heat-sensitive method, the difference being that each mandrel is first dipped in a coagulant prior to dipping in the elastomeric latex. The coagulant in the coagulant dip tank 43, for that coagulant-sensitive natural rubber latex compound recited above, may be a solution of calcium nitrate in ethanol at a specific gravity of about 1.2. In the coagulant-sensitive dipping method, the preheat oven 35 is at a temperature between about 120° F. and about 140° F. and the cure oven 36 is at a temperature between about 170° F. and about 190° F., each mandrel's dwell time within the preheat oven being between about 15 minutes and about 30 minutes and each mandrel's dwell time within the cure oven being between about 120 minutes and about 180 minutes.

As previously noted, either the heat-sensitive latex or the coagulant latex dipping method is used to fabricate the grip 10 of this invention in order to provide a grip having the desired physical characteristics in accord with the principles of this invention. While either dipping method may be used, the heat-sensitive dipping method is preferred at this time for practical reasons because only one dip of each mandrel 31 is required, i.e., because the mandrel needs only be dipped into the latex tank 37 and does not require a preliminary dipping into a coagulant tank 43.

A grip for an elongated or longitudinally extended handle of a hand-held implement (e.g., a baseball bat's handle), fabricated in accord with the principles and characteristics as set forth for this invention, may be easily and simply installed onto the implement's handle where the handle is rigid (i.e., nonbending) along its length and where the handle's free or outer end is displaced from the handle's inner end (which inner end of the handle is attached to the handle's working head) a distance about equal to the handle's length. A unique feature of the novel grip 10, and of the novel grip installation method, is that the grip may be installed in the field (e.g., in the case of a replacement grip) as easily as in the place of initial manufacture. This for the reason that the installation method requires, for its implementation, only a vacuum source 51 and a simply constructed vacuum chamber 52.

Figures 5, 6:
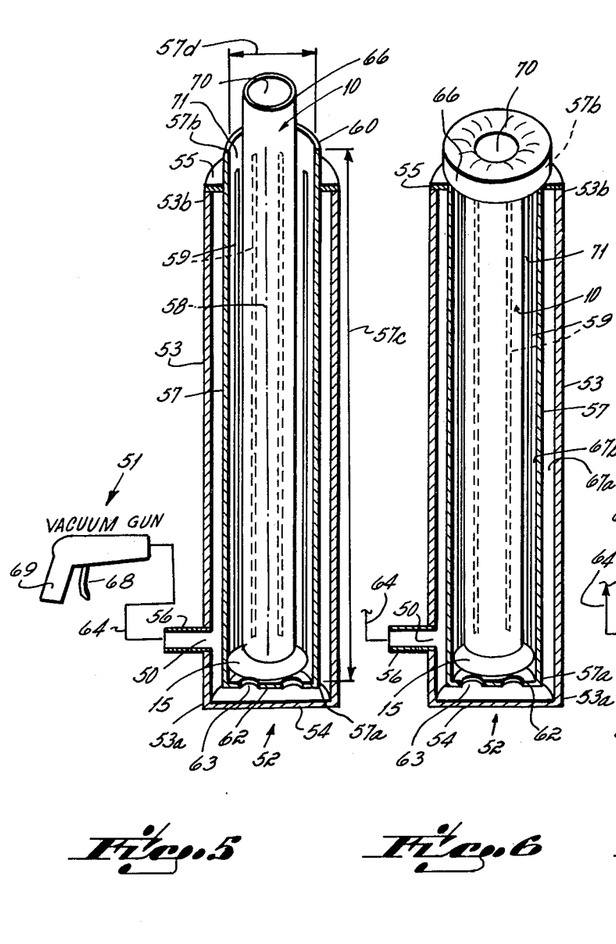
FIG. 5 illustrates a first step in installing the FIGS. 1 and 2 grip on a baseball bat's handle, and the apparatus used in connection therewith.
FIG. 6 is a view similar to FIG. 5 illustrating a second step in installing the FIGS. 1 and 2 grip on the baseball bat handle.

As shown in FIG. 5, the vacuum chamber 52 includes an outer tube 53 closed at bottom end 53a by floor 54 and at top end 53b by ceiling 55. The outer tube 53 includes a vacuum port 50 having a fitting 56. An inner tube 57 is disposed within the closed outer tube coaxially with outer tube 53 on axis 58. The inner tube 57 is elevated at its bottom end 57a above the floor 54 of the outer tube 53, and is of an overall length that permits same to extend out of the outer tube's ceiling 55 at its top end 57b into the atmosphere. The inner tube 57 has a slotted side wall, the slots 59 running parallel to the axis 58 of the vacuum chamber structure 52 but the slots 59 being provided in the side wall only interiorly of the outer tube 53. In other words, that portion 60 of the inner tube 57 (which, in a sense, forms a collar for the vacuum chamber 52) which extends up and out of the outer tube 53 has no slots therein, the joint 61 between the inner tube's collar 60 and the outer tube's ceiling 55 being airtight. Floor 62 of the inner tube 57 is also provided with holes 63 therein. Thus, that portion of the inner tube's wall and floor which are interior of the outer tube is air permeable, i.e., not airtight.

As shown in FIG. 5, a vacuum pump 51 (of a capacity sufficient to draw a vacuum of at least about 12–20 inches mercury) is interconnected with the outer tube's fitting 56 by flexible hose 64. The vacuum pump 51 may be of any hand operated, foot operated, or motor driven vacuum pump structure that is commonly known to those skilled in the art. A useful handgun type vacuum pump 51 is that marketed under the trademark MITY-VAC by Neward Enterprises, Inc. Upland, California 91786. Another manually operated vacuum pump is disclosed in U.S. Pat. No. 963,528. Generally speaking, the handgun type vacuum pump 51 (or foot operated vacuum pump, not shown) is highly useful in the sense that same may be used in the field, under certain conditions, to replace worn out grips 10 on the handles 12 of baseball bats 11. In other words, the hand vacuum pump 51 and vacuum chamber 52 structure illustrated in FIG. 5 may be used by a baseball coach at the baseball playing field to replace worn out grips with new replacement grips onto used baseball bats under certain conditions. It is understood, however, that more elaborate vacuum chamber 52 structures which are mechanically operated may be devised and used in a manufacturing facility for baseball bats 11 where grips 10 are initially provided on the bats as original equipment.

Note that the length 57c of the inner tube 57 in the vacuum chamber 52 structure (see FIG. 5) is slightly less than the length 10d of the baseball bat handle's grip 10 as initially produced (see FIG. 1), and that the internal diameter 57d of that inner tube 57 throughout its length 57c is substantially greater that the maximum diameter 15a of the grip's knob 15. Thus, and as an initial step in the installation of the grip 10 on the baseball bat's handle 12, the grip is dropped into the vacuum tube structure's inner tube 57 until the grip's boot 15 rests or sits on the ported floor 62 of the inner tube. In other words, the inner tube 57 (and, therefore, the vacuum chamber 52) is sized and configured throughout its length 57c to receive the grip 10 in inserted relation therein until the grip's boot is seated on a floor within the vacuum chamber. This orientation of the grip within the vacuum chamber 52, of course, exposes the open end 10a of the grip's tubular portion 14 to atmosphere, and orients the grip's open end adjacent the open end 57b of vacuum tube 57, yet permits the top end section 66 of the grip's tubular portion to extend above the inner tube 57 (and, hence, extend outside of the vacuum chamber 52 structure). After initially locating the bat's grip 10 in the vacuum chamber 52 structure in an upright attitude as shown in FIG. 5, the top end section 66 of the grip 10 is stretched outwardly by hand in a radial fashion from the grip's axis 13, and then turned downwardly over the vacuum tube structure's collar 60. In other words, the open end of the grip is cuffed outwardly and downwardly into a sealing interengagement with the vacuum tube's collar 60, compare FIG. 5 to FIG. 6. This cuffing of the grip's top end section 66 with the vacuum tube's collar 60 creates an airtight chamber 67 (comprised of sub-chambers 67a and 67b) within the outer tube, i.e., closes the vacuum tube's interior to the atmosphere.

After the grip 10 has been cuffed onto the vacuum tube's collar 60, a pressure differential is created between the interior 70 and exterior 71 of the grip sufficient to expand the grip into an internal girth throughout its longitudinal length 10d which is substantially greater than that handle section (knob 16 in the case of a baseball bat 11) having the largest external girth EG. In this embodiment, the pressure differential is created by drawing a vacuum within the vacuum chamber 52 by operation of the handgun type vacuum pump 51. A vacuum in the amount of about 12 inches Hg to about 20 inches Hg is all that need be pulled if the grip 10 has the physical characteristics before mentioned as preferable. The vacuum is pulled simply by manually retracting the handgun type pump's trigger 68 toward the pump's handle 69 a number of times until the entire grip 10, i.e., until the grip's tubular portion 14 and the grip's knob portion 15, has been sucked or drawn outwardly into supporting contact with the interior surface of the slotted inner tube 57. The slotted inner tube 57 functions to insure that the grip 10 is expanded or stretched outwardly under the vacuum in a symmetrical fashion. If the slotted inner tube 57 were not provided, under certain operational conditions it is possible that the grip 10 might be sucked against the vacuum tube's vacuum port 55, thereby closing the vacuum port prior to completely stretching the grip into the attitude which the grip would assume upon full exposure to the vacuum (which vacuum attitude of the grip is shown in FIG. 7).

An alternative vacuum chamber structure (not shown) to that shown in FIGS. 5–8 eliminates the slotted inner tube 57 but retains collar 60, thereby providing only a single tube chamber. In this alternative structure, a groove extending upwardly and longitudinally from the vacuum port on the surface of the tube's inside wall, and narrow enough to prevent the grip from expanding into same, may be provided to insure adequate air exhaust upon drawing the vacuum, thereby preventing premature closing of the vacuum port by the expanding grip. The same symmetrical stretching effect upon drawing a vacuum in this alternative vacuum chamber structure also can be accomplished by providing a channel leading away from the vacuum port which is defined by two parallel ribs that protrude inwardly from the single tube's inside face, the ribs being spaced close enough one to the other to prevent the grip from expanding into the channel defined by same and, thereby, preventing blockage of the vacuum port prematurely before the grip has been completely expanded throughout its length.

Once the pressure differential (which pressure differential between the interior 70 and exterior 71 of the grip 10 need be sufficient only to enlarge or stretch the grip's inside girth IG throughout the grip's length 10d so as to be sufficient to accept the implement's handle 12) has been created by vacuum between the interior 70 of the grip 10 and the exterior 71 of the grip so as to expand or stretch that grip away from its center longitudinal axis 13 into contact with the inside surface of the vacuum structure's inner tube 57, i.e., once sufficient vacuum has been pulled from the interior chamber 67 of the vacuum chamber 52 structure so as to stretch the grip out of its as-produced attitude shown in FIG. 1, the baseball bat may then be inserted handle 12 first into the vacuum chamber 52 structure through the open top end defined by the collar 60. The bat's handle 12 is simply inserted into and through the grip's stretched-open top section 66 until the handle's free or knob 16 end bottoms out in the grip's boot 15 and, thereby, rests on floor 62. This positively locates the baseball bat's handle 12 in the desired longitudinal relation, and in a substantially coaxial relation, within the vacuum chamber 52 and, therefore, with the vacuum-stretched grip 10. There is, as previously mentioned, a definite dimensional relation between the vacuum chamber's interior size and configuration throughout its length 57c, i.e., interior diameter 57d of the vacuum chamber's cylindrical inner tube 57, and the exterior size and configuration of the baseball bat's handle 12 throughout its length 12c. This dimensional and configurational relationship, which generally speaking is the same from a concept standpoint for the handle of any hand-held implement vis-a-vis the grip to be provided thereon, is simply that the tube 57, at the most constricted point along its axis 58, must be larger than the implement's handle at its largest point along its axis 116. In other words, in this connection, the inside dimensions and configuration of inner tube 57, i.e., of the vacuum chamber 52, are sized so as to permit a degree of expansion sufficient to accept the implement's handle into the interior of the grip as expanded in the aformentioned manner without touching the grip during insertion of the handle. This for the reason, of course, that the implement's handle must be insertable to the floor 62 of the vacuum structure's inner tube 57 so as to properly position and support the implement's handle 12 in the correct spatial orientation relative to the grip already in the stretched configuration within the vacuum chamber 52 structure.

Figures 7, 8:
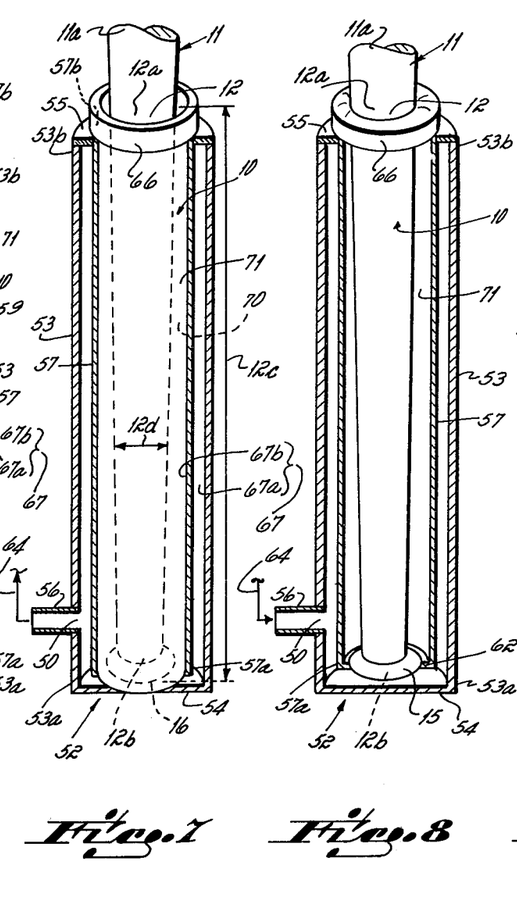
FIG. 7 is a view similar to FIGS. 5 and 6 showing insertion of the baseball bat handle into desired positional relation with the FIGS. 1 and 2 grip after a pressure differential has been established between the interior and exterior of the grip.
FIG. 8 is a view similar to FIG. 7 showing the FIGS. 1 and 2 grip in a tight, friction-fit relation with the baseball bat handle after the pressure differential has been released.

After the baseball bat's handle 12 has been dropped into a supported position within the vacuum-stretched grip 10 located in chamber 52 structure as shown in FIG. 7, the vacuum (i.e., the pressure differential) from the vacuum chamber 52 structure is released, thereby permitting atmospheric air to re-enter the interior 67 of the vacuum chamber 52 through port 55. When the vacuum is released, and due to the elasticity of the grip 10, the grip immediately attempts to contract back into its original as-produced attitude as shown in FIG. 1. However, and since the average external girth EG of the bat's handle 12 along its handle length 12c is greater than the average internal girth IG of the grip in its as-produced state along its length 10d, the grip stretches into a relatively tight frictional contact with the bat's handle from one end 10a thereof to the other 10b as shown in FIG. 8. The degree of friction fit depends to some extent on the elastomeric material used, as well as on the relation of the handle's average external girth EG to the grip's average internal girth IG (the smaller the grip's average internal girth IG, the tighter the friction fit). Note particularly, in FIG. 8, that the grip's boot 15 is stretched around the bat's knob 16 end, the baseball bat having been properly positioned vis-a-vis the knob portion of the grip 10 when the bat is initially inserted into that position as shown in FIG. 7. The open end or cuffed portion 66 of the grip 10 is then uncuffed from its stretched relation with the vacuum tube's collar 60. This uncuffing also unrolls the grip's cuff 66 portion into a stretched or friction fit interengagement with the baseball bat's handle 12 as well.

If desired, and prior to insertion of the baseball bat's handle into the vacuum-stretched grip 10 as shown in FIG. 7, the handle portion of the bat may be provided with a coating of glue or other adhesive substance. This intermediate glue step, while not required under all circumstances, may be desirable to insure that the grip is retained in tight, fixed relation with the handle, and does not slip relative thereto, when in final friction fit position on the baseball bat, or other hand-held implement. The use or not of a glue also depends to some extent on the substrate (wood, metal or plastic) from which the implement handle is fabricated. Note that this installation method permits a liberal quantity of glue to be so applied to the bat's handle with no worry that the grip will scrape it off, or otherwise reduce the effectiveness thereof, as the grip is installed for the reason that the grip simply contracts radially (relative to the grip's axis 13) from its expanded attitude into direct contact with the implement handle's exterior surface after the implement's handle 12 has been positioned as shown in FIG. 7 and upon release of the pressure differential.

Figure 9:
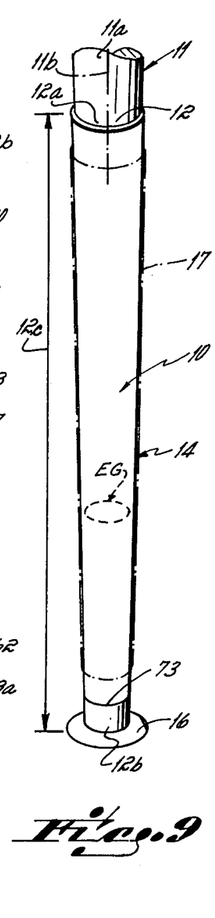
FIG. 9 shows the baseball bat with the FIGS. 1 and 2 in final friction fit or fixed position thereon and removed from the installation apparatus.

In the case of the baseball bat 11 illustrated, it may be desirable to leave the grip's boot 15 on the knob 16 of the bat after the grip has been installed thereon. Alternatively, it may be desirable to remove the grip's boot from the baseball bat so as to provide a bat more aesthetically similar to bats presently known to the game of baseball. If removal of the grip's boot 15 is desired, a razor blade (not shown) need merely be used to circumferentially slit the boot from the tubular portion 14 of the grip along line 73 (see FIG. 9) after the grip has been applied to the bat's handle as shown in FIGS. 5-8. The boot 15 is thereafter removed from the bat's knob 16 simply by peeling same off the knob. As mentioned, this slitting step is not required and, indeed, may be undesirable if the user, at a subsequent date, wishes to remove the grip from the baseball bat by the same vacuum method means (but in reverse sequence) by which it was applied. Of course, removal of the grip 10 from the bat's handle 12 by the vacuum means cannot be achieved unless the grip is closed at one end by the boot 15 as, otherwise, no pressure differential relation by vacuum could be achieved between the grip's interior 70 and exterior 71.

Note particularly that this installation method permits simple and easy installation of a grip on an implement's handle when that handle is of a variable or non-uniform girth and/or cross-sectional area from one end thereof to the other (e.g., a baseball bat handle), as well as on an implement handle that is of other than a cylindrical shape (e.g., a hexagonal tennis racket handle). Further, and as described, the installation method permits field installation as well as installation at the factory because of the relatively low vacuum requirements necessary to stretch or expand a grip 10 fabricated in accord with the principles of this invention. Additionally, the method is capable of being executed very quickly.

Having described in detail the preferred embodiment of my invention, what I desire to claim and protect by Letters Patent is:

1. A method of installing a grip on the handle of a baseball bat, said installation method comprising the steps of providing said grip with a generally tubular portion at one end and a boot portion at the other end integral with said tubular portion, said grip having an average internal girth between about 5% and about 50% less than the average external girth of said handle for that portion of said handle on which said grip is to be mounted so as to establish a friction fit therebetween, an average wall thickness of between about 0.01 inches and about 0.10 inches, a percentage elongation at break between about 500% and about 1000%, a tensile strength at break between about 2000 psi and about 6000 psi, and a modulus at 200% elongation between about 100 psi and about 500 psi, exposing the exterior surface of said grip to a vacuum sufficient to expand said grip throughout its longitudinal axis, said expansion being to an extent that permits said bat handle to be inserted therein without significantly touching the interior surface of said grip while the exterior surface is exposed to said vacuum, orienting the free end of said bat handle adjacent the open end of said grip, inserting said bat handle into said grip free end first until said free end bottoms out against said grip's boot after expanding of said grip, bottoming out of said free end against said bottom serving to properly position said bat handle relative to said grip, therafter releasing said vacuum from the exterior of said grip, same permitting said tubular portion to contract into a friction fit relation with said bat handle and said bottom portion to cover the bat knob, severing said boot from said tubular portion of said grip, and removing said boot from mounted relation with the bat knob, thereby exposing said knob and leaving said tubular portion in friction fit relation with said bat handle.

2. A method as set forth in claim 1 including the step of providing a limit stop in a vacuum chamber within which said grip is postioned, said boot being adapted to abut said limit stop upon insertion thereinto to properly position same within said chamber, and said limit stop also functioning to retain said boot in a fixed position as said bat knob is bottomed out against said boot.

3. A method as set forth in claim 2 including the step of cuffing the open end of said tubular portion over a collar on said vacuum chamber to aid in defining an airtight chamber within which said grip is positioned prior to exposing said grip to a vacuum.

4. A method as set forth in claim 1 wherein said vacuum is created by one of hand and foot operated vacuum pumps.

* * * * *